United States Patent
Seiple et al.

(10) Patent No.: US 7,789,450 B2
(45) Date of Patent: Sep. 7, 2010

(54) VEHICLE WINDOW ASSEMBLY

(75) Inventors: Shane C. Seiple, Perrysburg, OH (US);
Charles E. Ash, Perrysburg, OH (US);
H. Richard Voght, Perrysburg, OH (US)

(73) Assignee: Pilkington North America, Inc.,
Toledo, OH (US)

( * ) Notice: Subject to any disclaimer, the term of this patent is extended or adjusted under 35 U.S.C. 154(b) by 0 days.

(21) Appl. No.: 12/623,467

(22) Filed: Nov. 23, 2009

(65) Prior Publication Data

US 2010/0071270 A1 Mar. 25, 2010

Related U.S. Application Data

(62) Division of application No. 11/974,588, filed on Oct. 15, 2007, now Pat. No. 7,641,265.

(60) Provisional application No. 60/855,261, filed on Oct. 30, 2006.

(51) Int. Cl.
*B60J 1/10* (2006.01)

(52) U.S. Cl. .............. 296/146.15; 296/146.16

(58) Field of Classification Search ......... 296/146.15, 296/190.1, 201, 146.16; 49/413, 227, 380, 49/375, 502

See application file for complete search history.

(56) References Cited

U.S. PATENT DOCUMENTS

| | | | | | |
|---|---|---|---|---|---|
| 4,124,054 | A | * | 11/1978 | Spretnjak | 160/90 |
| 4,936,368 | A | * | 6/1990 | Philbeck et al. | 160/90 |
| 5,146,712 | A | * | 9/1992 | Hlavaty | 49/118 |
| 5,423,144 | A | * | 6/1995 | Santos | 49/189 |
| 5,442,880 | A | * | 8/1995 | Gipson | 49/413 |
| 5,522,191 | A | * | 6/1996 | Wenner et al. | 52/204.51 |
| 5,996,284 | A | * | 12/1999 | Freimark et al. | 49/209 |
| 6,125,585 | A | * | 10/2000 | Koneval et al. | 49/349 |
| 6,324,788 | B1 | * | 12/2001 | Koneval et al. | 49/121 |
| 6,902,224 | B2 | * | 6/2005 | Weinert et al. | 296/146.16 |
| 7,003,916 | B2 | * | 2/2006 | Nestell et al. | 49/413 |
| 7,029,055 | B2 | * | 4/2006 | Bourque et al. | 296/146.16 |
| 7,051,478 | B2 | * | 5/2006 | Bourque et al. | 49/413 |
| 7,155,863 | B2 | * | 1/2007 | Daniel et al. | 49/413 |
| 7,185,943 | B2 | * | 3/2007 | Lesle et al. | 296/146.16 |
| 2006/0107599 | A1 | * | 5/2006 | Luten | 49/413 |
| 2006/0107600 | A1 | * | 5/2006 | Nestell et al. | 49/413 |
| 2007/0157522 | A1 | * | 7/2007 | Hebert et al. | 49/413 |
| 2008/0060275 | A1 | * | 3/2008 | Recker | 49/408 |
| 2008/0127563 | A1 | * | 6/2008 | Tooker | 49/349 |

(Continued)

*Primary Examiner*—Kiran B. Patel
(74) *Attorney, Agent, or Firm*—Marshall & Melhorn, LLC

(57) ABSTRACT

A flush-flush horizontal vehicle window assembly is provided that includes a sliding panel with guide pins, formed with a load-bearing shoulder, on sliding panel corners, and a frame defining a window opening. The frame is attached to two fixed panels. Upper/lower tracks are attached above/below the window opening. Each track has a leading and a trailing guide path formed through a surface of the respective tracks, where the pins partially project into the guide paths and where load-bearing shoulder surfaces smoothly and reliably slide on the track surfaces. Each leading guide path is "S" shaped and each trailing guide path is shaped in a perpendicular manner at one end, which causes the sliding panel to smoothly enter and seal the window opening in a flush manner. An aesthetically pleasing flush-flush slider results when the sliding panel is in the plane of the window opening and further in the plane of the outer vehicle body panel.

12 Claims, 6 Drawing Sheets

U.S. PATENT DOCUMENTS

2009/0019778 A1 * 1/2009 Lahnala ....................... 49/413
2009/0212591 A1 * 8/2009 Seiple et al. ................ 296/154
2009/0250975 A1 * 10/2009 Arimoto ..................... 296/201

* cited by examiner

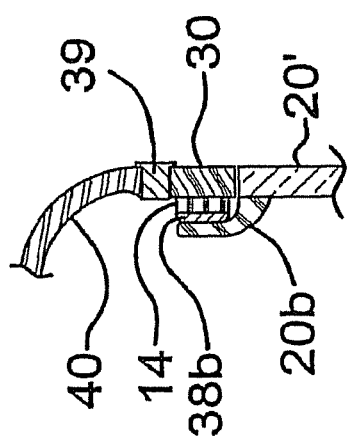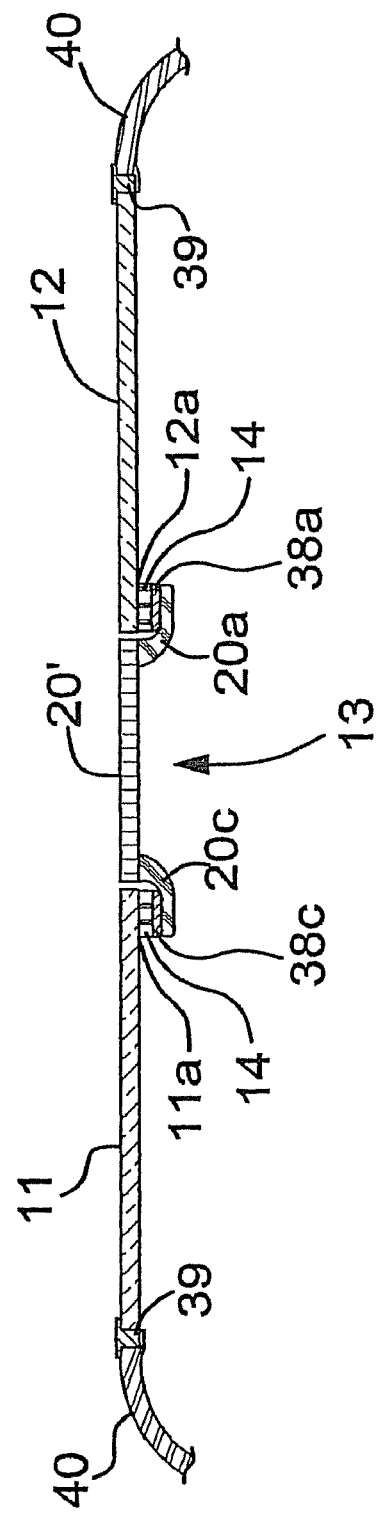

VEHICLE WINDOW ASSEMBLY

RELATED APPLICATION

This application is a divisional application of application Ser. No. 11/974,588 filed Oct. 15, 2007 now U.S. Pat. No. 7,641,265, which claims the benefit under 35 USC 119(e) of the provisional application filed Oct. 30, 2006 and assigned Ser. No. 60/855,261. Each of these applications are incorporated herein by reference in its entirety.

FIELD OF THE INVENTION

The present invention relates to a horizontal vehicle window assembly and, in particular, to a so-called flush-flush vehicle window assembly with horizontal slider.

BACKGROUND OF THE INVENTION

It is known that pickup trucks and other related vehicles have a rear window, or backlite, that is mounted in the vehicle body opening, often immediately behind seats in the vehicle passenger compartment. Typically, such backlites are supplied to vehicle manufacturers as a one piece or as a stand-alone frame assembly for installation in new vehicles being manufactured on an assembly line.

In some of these vehicles, the backlite is provided with a sliding panel mechanism and a seal system (commonly known as a slider), which opens and closes over an opening in the backlite, so as to allow, for example, outside air to enter the vehicle compartment and to allow for passing of objects through the backlite opening. Sliders, in which a sliding panel moves in either a horizontal direction or a vertical direction, typically comprise at least one sliding panel that utilizes, for example, frame channels, rails, or tracks to facilitate sliding motion. In addition, a frame, with an attached seal(s), acts to seal out moisture and noise from entering the vehicle compartment at the periphery of the backlite.

It is common for the stand-alone backlite assembly to be molded and subsequently mounted into the vehicle body opening in the vehicle body frame, where the backlite assembly is secured to the vehicle body opening with adhesives and/or mechanical fastening devices, for example, studs. A urethane adhesive is frequently used in backlite applications, such adhesive being applied to a mounting surface of the vehicle body opening and/or the backlite assembly, prior to the moment at which these two structures are brought into bonding contact.

In addition to the slider panel, some of the vertical slider assemblies have two fixed panels (hence, they are known as partial sliders), which typically are positioned on either side of the backlite opening. Each fixed panel has a substantially vertically oriented panel edge, on which a vertical track and/or division post are often disposed.

Typically for the horizontal sliders, the backlite opening is further defined by an upper header member and a lower beltline support member. In addition, for the horizontal sliders, the slider panel is typically moved in a horizontal direction behind one or both of the fixed panels that span the vehicle opening (along horizontal tracks that are commonly disposed on or near the fixed panels) and then, is moved to cover the backlite opening. These movements of the sliding panel may be provided by manual or electro-mechanical means.

Some slider assemblies are further designated as being flush where the sliding panel is in the plane of the fixed panel(s), when the sliding panel completely closes the backlite opening, or the complete window assembly may be in the plane of a vehicle body panel. Various ways to achieve flush orientation to fixed panels are, for example, by utilizing guide pins, ramps, and cams to move the sliding panel into the backlite opening.

An example of a horizontal slider that moves its sliding panel into the plane of a fixed panel, when the sliding panel completely closes the backlite opening, is U.S. Pat. No. 4,561,224 to Jelens, who teaches a sliding window assembly having opposed longitudinally spaced first and second guide pins on the top and the bottom of a slidable window that are adapted for sliding motion within corresponding first and second tracks respectively, as shown, for example, in Jelens' FIGS. 2-5 and 7. As illustrated, for example, in Jelens' FIGS. 7, 9, and 10, the leading and trailing guide tracks complement one another by being laterally disposed across the sliding window assembly, wherein the trailing guide tracks are "S" shaped as the sliding panel enters the plane of the fixed panels.

U.S. Pat. No. 5,542,214 to Buening teaches a flush-closing multi-pane window assembly having upper and lower, left and right side guide pins disposed on top and bottom corners of a sliding pane. The guide pins slide within closely fitting guide channels, so as to minimize wind rattle and the like. The channels are cut to different depths, where pins of correspondingly different lengths slide within the guide channels. As illustrated, for example, in Buening's FIGS. 8A-B, the guide channels are utilized to substantially simultaneously move the sliding pane into and out of the window opening, wherein the trailing guide channels are "S" shaped as the sliding pane enters the plane of the fixed panes.

Similarly, U.S. Pat. No. 5,996,284 to Freimark et al. discloses a sliding vehicle window assembly having fixed panels that are interconnected by upper and lower frame members or tracks. Projecting pins are disposed at upper and lower corners of a movable window panel that is utilized to open and close a window aperture in the vehicle window assembly. The projecting pins slide in upper and lower channels that are defined in the leading and trailing tracks, which are arranged in tandem or in an end-to-end alignment as shown, for example, in Freimark's FIGS. 5A-B. In conjunction with the pins and the channels, a cam is used to simultaneously move the movable window panel in and out of the window aperture, wherein the trailing tracks slope into the window aperture.

Although the above-described flush window assemblies might satisfy a current automotive industry styling need for aesthetically pleasing flush slider assembly designs, it does not appear that these designs have been utilized to any degree by the automotive industry in, for example, pickup trucks.

It further appears that this lack of automotive industry utilization may be due in part to the following reasons: a) the sliding motion between the slider panel and its mating paths/rails is hampered by wear and tear of the projecting pins rubbing on the interior sides and bottom/top of the paths, which in part is further hampered by dirt and moisture that builds up in the paths, b) it has been found in the present invention that "S" shaped trailing guide paths cause the slider panel to ramp too quickly and thus, not seal the backlite opening properly, resulting in a wide vertical gap, and c) the sealing-out of moisture, noise, and dirt between the slider panel and the assembly of the fixed panels, at the backlite opening, is not as complete as the automotive industry demands.

Hence, a flush multiple pane horizontal vehicle slider window assembly is sought that provides reliable, unencumbered sliding motion between the slider panel and the mating channels/rails, and which also provides reliable moisture, noise, and dirt control at the backlite opening. In addition, a slider is sought that would be considered flush-flush, wherein the slider is not only flush within itself (i.e., the sliding panel being in the same plane as the fixed panels) but the slider assembly would also be in the same plane as the outer vehicle body panel. Such a slider assembly would be aesthetically pleasing by giving the appearance of one continuous sheet of glass for a multi-pane window.

SUMMARY OF THE INVENTION

A vehicle window assembly with a horizontal slider adapted to be secured within a vehicle body opening, the vehicle window assembly comprising the following elements: A fixed panel defining a window opening, an upper track disposed above the window opening and having an upper guide path formed therein, a lower track disposed below the window opening parallel to the upper track, the lower track having an upper surface with a lower guide path formed therethrough, and a sliding panel having opposed upper and lower sliding panel edges with at least one upper guide pin secured at the upper sliding panel edge and received within the upper guide path and with at least one lower guide pin secured at the lower sliding panel edge and received within the lower guide path, wherein the at least one lower guide pin is formed with a shoulder having a surface slidably engaging the upper surface of the lower track.

It may be preferred that neither of the upper/lower pins make contact with the top/bottom of its respective guide path, but at least a portion of the weight of the sliding panel is distributed over the lower guide pin shoulder surface which, as stated above, is in slidable contact with the lower track surface.

In a separate aspect of the present invention, there are leading and trailing guide paths in the upper and in the lower tracks, where each of the trailing guide paths is substantially perpendicular (i.e., not formed in the shape of an "S") to the window opening at the end of each trailing guide path that is nearest to the window opening, and where each of the leading guide paths is formed in an "S" shape at the leading guide path end where the leading sliding panel edge enters the window opening. Thus, the window opening is closed in a non-simultaneous manner. The present invention may further comprise a frame that is adapted to be secured on the fixed panel, the frame further defining the window opening (i.e., the frame opening).

It may be advantageous to provide the invention as a flush horizontal vehicle slider window assembly where the slider panel is in the plane of the fixed panel when the slider panel closes the window opening. Such a flush horizontal vehicle slider window assembly may then become a flush-flush horizontal slider assembly when the flush horizontal vehicle slider window assembly is disposed over a vehicle panel opening while being in the same plane as an outer vehicle body panel.

Further advantages of the present invention will be apparent from the following description and appended claims, reference being made to the accompanying drawings forming a part of a specification, wherein like reference characters designate corresponding parts of several views.

BRIEF DESCRIPTION OF THE DRAWINGS

FIG. 5 is a cross sectional view in the direction of the arrows 5-5 of FIG. 4;

FIG. 6 is a cross sectional view through the partial horizontal slider of FIG. 4, in the direction of the arrows 6-6.

DETAILED DESCRIPTION OF THE INVENTION

Figure 1:
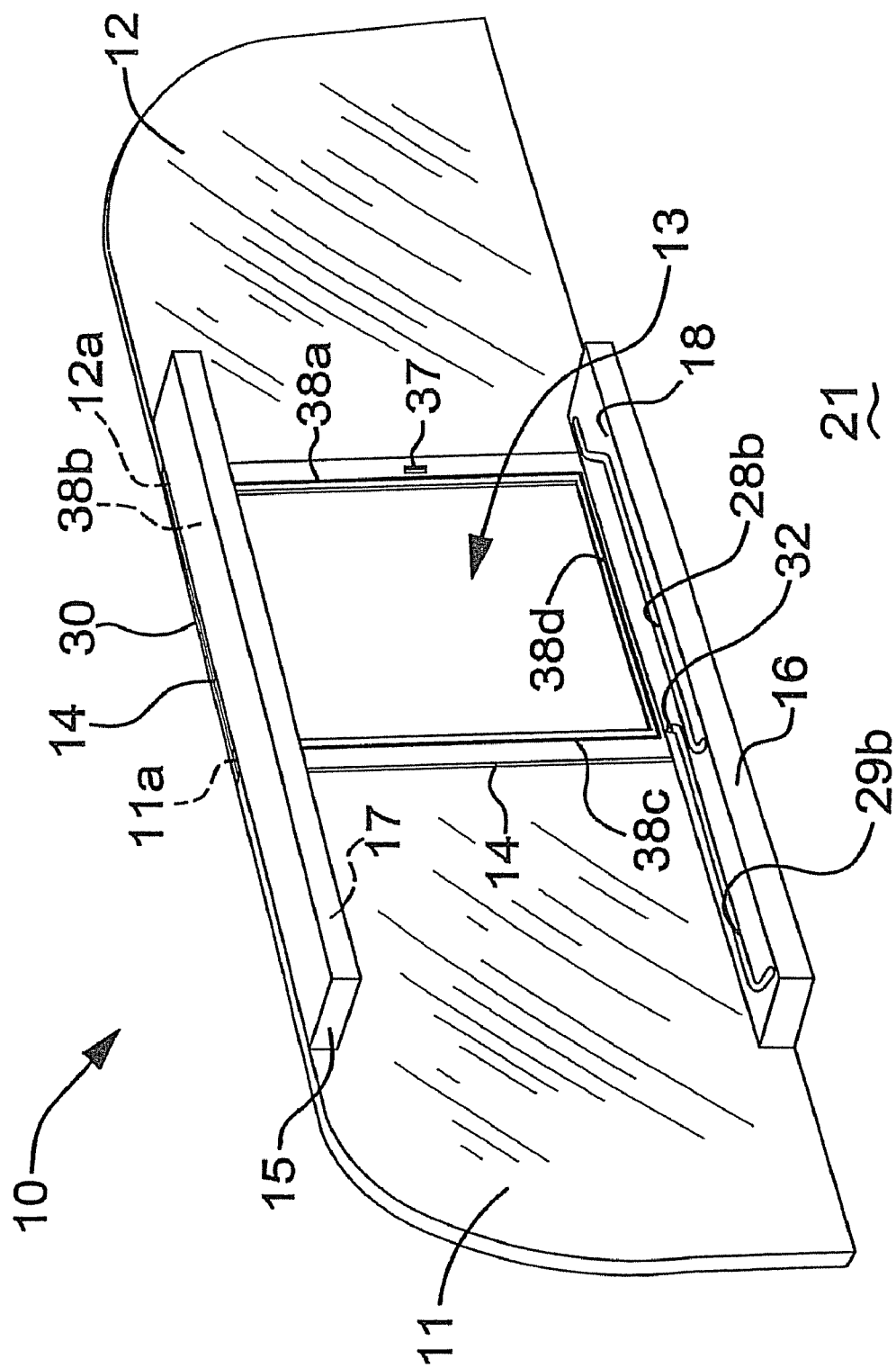
FIG. 1 is a three dimensional view of a partial horizontal slider in accordance with the present invention.
Figure 2:
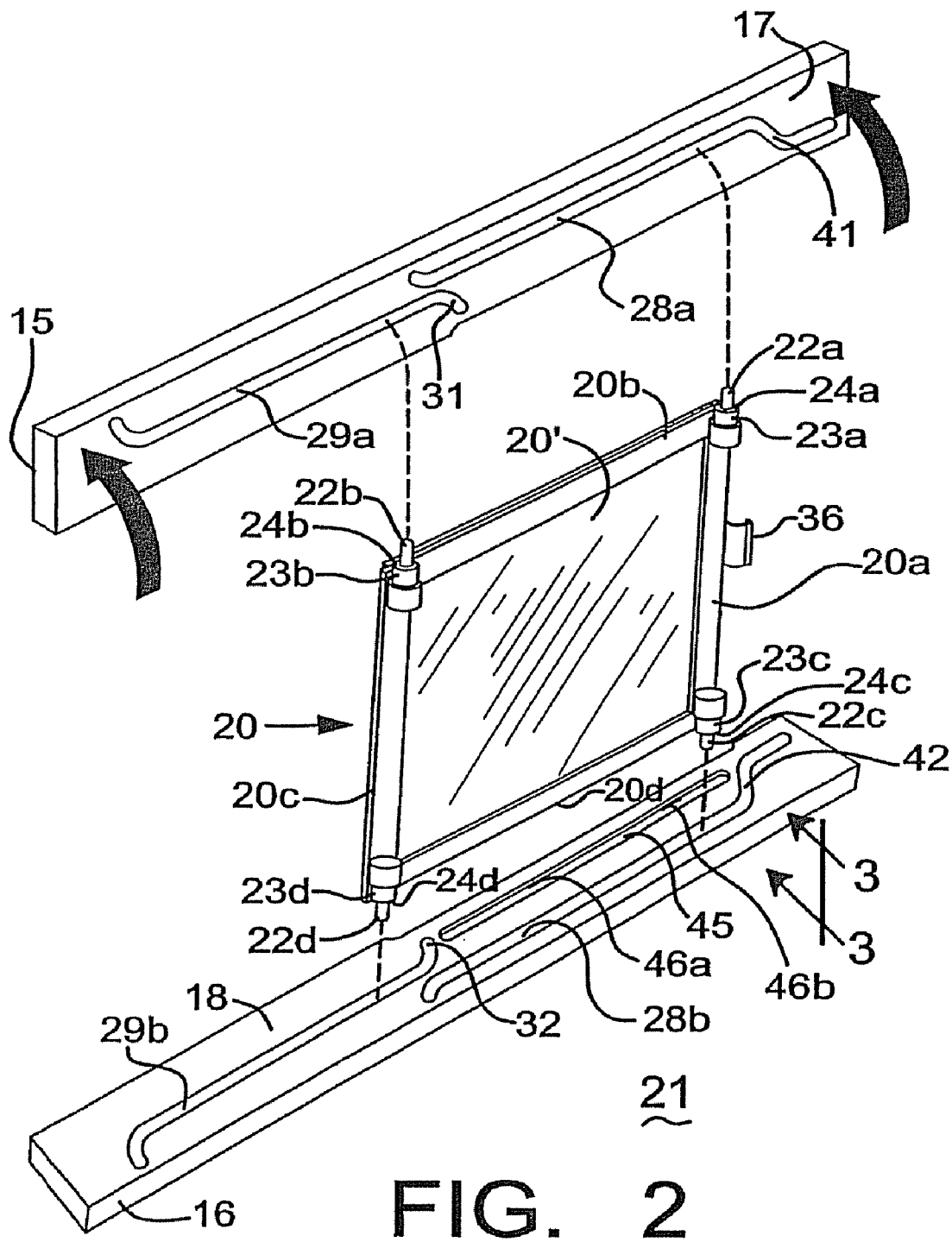
FIG. 2 is a three dimensional view of an upper track and a lower track of the partial horizontal slider of FIG. 1, with a slider panel assembly therebetween, in accordance with the present invention.

Illustrated in FIGS. 1-7 is a horizontal vehicle slider window assembly 10, typically a backlite with a slider, having at least one sliding panel assembly 20 (a.k.a. a slider panel assembly), which is utilized to open and close a window opening 13 (i.e., the backlite opening). FIG. 1 is viewed from within a vehicle compartment 21, where, for example, driver and passenger seating 26 (see, FIG. 7) may be disposed in a vehicle 25, for example, a pick up truck. As shown in FIG. 2, the slider panel assembly 20 comprises a sliding panel 20' that has an upper edge 20b and a lower edge 20d where each edge 20b,d, respectively, has first pins 22a,c and second pins 22b,d disposed thereon, and where each pin 22a-d has a respective load bearing shoulder 23a-d with a respective shoulder surface 24a-d.

The horizontal vehicle window assembly 10 also comprises at least one fixed panel 11,12, where each fixed panel 11,12 has a substantially vertical fixed panel edge 11a,12a, and where a frame 14 (see, for example, FIGS. 5 and 6) that defines the window opening 13 is secured on each of the fixed panel edges 11a,12a.

As shown in FIGS. 1, 5, and 6, in order to seal the window opening 13 off from, for example, exterior moisture, noise, dirt, and debris, seals 38a-d are disposed on the interior periphery of the frame 14. However, it is within the spirit and scope of the present invention that the seals 38a-d could be an integral (i.e., unitary) part of the frame 14, that the seals 38a-d could be disposed on the exterior periphery of sliding panel edges 20a-d, or that the seals 38a-d could be an integral part of the sliding panel edges 20a-d, where the edge 20a is the leading sliding panel edge 20a and the edge 20c is the trailing sliding panel edge 20c.

It is also within the spirit and scope of the instant invention that a fixed panel, in any combination of the items 11, 12, 30, and 30a (which are shown, for example, in FIG. 4), could define the window opening 13. Such combinations may or may not comprise the frame 14, in which case the seals 38a-d could be disposed on the interior periphery of the window opening 13.

Although FIG. 5 illustrates a cross sectional view at the top of the horizontal vehicle window assembly 10, in the direction of the arrows 5-5, a similar view would be seen at the bottom of the assembly 10, with at least the exceptions that items 20b,30,38b would, respectively, be replaced by items 20d,30a,38d.

In addition, the horizontal vehicle window assembly 10 further comprises an upper track 15 and a lower track 16, respectively, disposed above and below the window opening 13 and parallel to one another, where each track 15,16, respectively, has a major track surface 17,18, with a leading guide path 28a or 28b and a trailing guide path 29a or 29b disposed through the respective track surface 17 or 18 and disposed within the respective track 15 or 16. The upper track surface 17 and its associated upper guide paths 28a,29a are of the same design and shape as, and cooperate with, the lower track surface 18 and its associated lower guide paths 28b,29b. Note that the curved arrows, at the ends of the upper track 15 in FIG. 2, indicate that the upper track 15 has been rotated in order to illustrate guide paths 28a,29a on the bottom side of the upper track 15.

It is also conceivable that the frame 14 and the tracks 15,16 may be one integral (i.e., unitary) part. In such a case, the frame 14 or the sliding panel assembly 20 would need to be formed in such a manner as to allow assembly of the guide pins 22a-d into the guide paths 28a,b and 29a,b (i.e., 28 and 29), so that the sliding panel assembly 20 could still be disposed between the guide tracks 15,16, as the present invention requires.

In general, the structure of the present invention requires that the pins 22a,b and 22c,d partially project into their respective guide paths 28a,b and 29a,b for guidance but not for load-bearing. However, each load bearing shoulder surface 24a,b and 24c,d may be in slidable load-bearing contact with its associated major track surface 17 and 18. Due to gravity, the lower load bearing shoulder surfaces 24c,d would especially be in load bearing contact with the lower major track surface 18.

Figure 3:
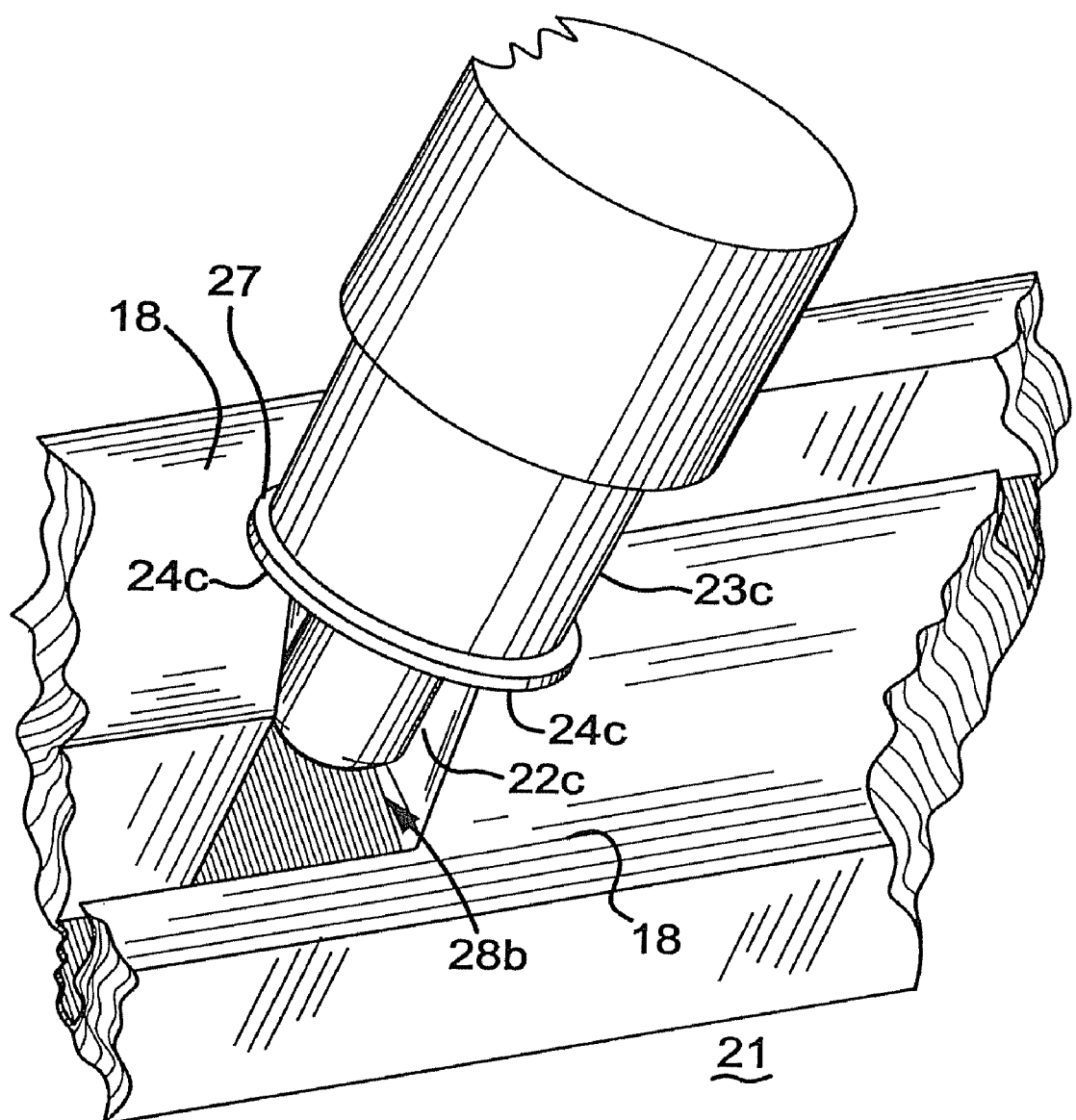
FIG. 3 is a three dimensional partial view in the direction of the arrows 3-3 of FIG. 2.

The load bearing shoulders 23a-d may have a load bearing washer 27 disposed thereon. As a result, the surface of the washers 27 facing the respective major track surface 17,18, in effect, become the load bearing shoulder surface 24a-c. As an example, FIG. 3 shows a washer 27 disposed on the lower right (as seen in FIG. 2) load bearing shoulder 23c.

Thus, the top (i.e., farthest extent) of each of the upper guide pins 22a,b is separated from the top of the upper guide path 28a,29a, throughout the travel of each of the upper guide pins 22a,b within the upper guide paths 28a,29a. In addition, the bottom (i.e., farthest extent) of each of the lower guide pins 22c,d is separated from the bottom of the lower guide paths 28b,29b, throughout the travel of each of the lower guide pins 22c,d within the lower guide paths 28b,29b. For example, FIG. 3 shows the pin 22c separated from the bottom of the lower guide path 28b where the load bearing shoulder surface 24c of the shoulder 23c would be in slidable contact with the track surface 18, if the washer 27 is not installed. In fact, the paths 28,29 may be open and have no bottom or top.

Since the pins 22a-d do not contact the top/bottom of the guide paths 28,29 or necessarily bear against the internal sides of the guide paths 28a,b,29a,b, debris within the guide paths 28,29 would not disrupt the motion of the sliding panel assembly 20 as much as if the sides of the pins 22a-d were to be very close to the internal sides of the guide paths 28,29. This is of particular significance when considering that typically the pins 22a-d comprise steel, and the sides and bottoms of the paths 28,29 typically comprise a polymer compound. Instead, in the present invention, the load-bearing shoulder surfaces 24a-d slidably engage the track surfaces 17,18, thus providing an opportunity of utilizing the best materials for each item 22a-d, 24a-d, 28a,b,29a,b to result in easy sliding motion, noise reduction, and serviceability.

Further, each of the trailing guide paths 29a,b is formed to be substantially perpendicular (therefore, not "S" shaped) to the window opening 13 at the respective end 31 or 32 of the corresponding trailing guide path 29a or 29b that is nearest to the window opening 13. It has been found that in providing these substantially perpendicular path endings 31,32, a non-aesthetically pleasing clearance gap of considerable width is prevented, which otherwise would exist in the area of the seal 38c (see, for example, FIG. 6).

Such a wide potential gap, in conventional slider assemblies, results between a fixed panel and a trailing sliding panel edge, when the trailing guide path is formed in the shape of an "S" at the end of the trailing guide path that is nearest to the backlite window opening. In addition, such a potential gap is difficult to seal off from the outside elements and noise. Also, it is a discovery of the present invention that if the trailing edge is guided out of the backlite opening too quickly, then the slider is difficult to open at the leading edge.

Hence, in the present invention, when a handle/latch 36 is urged from left to right (as generally seen in FIG. 2), the sliding panel 20 moves from a position in a plane offset to and behind the fixed panel 11, and then the leading sliding panel 20a edge enters the window opening 13 before the trailing sliding panel edge 20c enters the window opening 13. As a result, the sliding panel 20 moves to a position in the plane of the fixed panels 11,12, which is across the window opening 13 and closes the window opening 13, wherein the shoulder surfaces 24a,b and 24c,d of the respective guide pins 22a,b and 22c,d slidably engage their corresponding track surface 17,18.

In utilizing such a configuration, the gap at the trailing edge 20c is much smaller than the known designs previously described. In addition, when the slider panel assembly 20 is opened, the trailing edge 20c leaves the window opening 13 before the leading edge 20a leaves the plane of the fixed panels 11,12. Thus, in the present invention, the sliding panel 20' is easy to open.

Note that, in general, throughout the subject application and, in particular, with respect to the dimensional differences between the trailing edge 20c and the leading edge 20a (i.e., within the paths 29a,b and 28a,b), which may only be in fractions of an inch, the patent figures are not intended to be utilized to precisely measure these difference.

As a result of the above-discussed design of the leading and trailing paths 28,29, the leading sliding panel edge 20a enters the window opening 13 (i.e., via the leading guide paths 28a,b through the "S" shape areas 41 and 42). Subsequently, (and, therefore, in a non-simultaneous manner) the trailing sliding panel edge 20c enters the window opening 13 (i.e., in the non-"S" shape areas 31 and 32) in a substantially perpendicular orientation to the frame 14 wherein the handle/latch 36 can then be connected to a latch receiver 37 that is disposed on or near to the frame 14 (for example, on the fixed panel 12), so as to secure the window opening 13. The latch 36 and latch receiver 37 may be common in the art.

In the present invention, by forming the trailing paths 29a,b with the substantially perpendicular path endings 31,32, along with forming the leading paths 28a,b in the "S" shape areas 41,42, it has been found that the engagement of the seal 38a by the leading sliding panel edge 20a is superior to existing leading path designs where the leading paths terminate abruptly and/or where the leading and the trailing paths simultaneously move the leading and trailing sliding panel edges into and out of the window opening.

Although not wishing to be held to any theory, in the present invention it appears that after the left sliding panel edge 20c is seated well (due at least in part to the substantial perpendicularity at the right ends 31,32 (see, for example, FIG. 2) of the trailing paths 29a,b), then good compression of the right seal 38a is achieved.

The sliding panel assembly 20 may be power driven where, for example, a portion of the leading lower pin 22c would be mechanically coupled to a drive mechanism (not shown, but could be common in the art or be that disclosed in U.S. Application Publication 2004/0163315 to Gillen, which is incorporated herein by reference). As a result, the drive mechanism would open and close the window opening 13, by moving the sliding panel assembly 20 out of and into the window opening 13.

As a result of the above-stated designs of the guide paths 28a,b and 29a,b, the present invention results in a flush and aesthetically pleasing slider assembly, where the sliding panel 20' is in the plane of the fixed panels 11,12 (see, for example, FIG. 6), when the window opening 13 is closed by the sliding panel assembly 20. In addition, the leading path "S" areas 41,42 offer greater resistance from a motive force that may be directed inward (as in the case of an attempted theft directed toward entering the vehicle compartment 21).

These features of the present invention are in contrast to conventional sliding assemblies that require the addition of anti-theft tabs. Also, ramps and cams, like those used in Buening and Freimark, are in contrast to the present invention, since such ramps and cams tend to be resisted by seal compression, especially if the opening and closing mechanism is offset from the center of the sliding panel assembly, thus not sealing the backlite opening adequately.

It should be appreciated that it is within the spirit and scope of the present invention that the orientation of the structure 10 may be reversed, where the tracks 15,16 would be disposed more toward the right side (as viewed in FIG. 1) of the interior of the assembly 10 and, therefore, the sliding panel assembly 20 would be moved from the right window opening edge (i.e., in the proximity of the right fixed panel 12) toward the center of the horizontal vehicle window assembly 10, in order to close the window opening 13.

Therefore, it is a discovery of the instant invention that the guide pins 22a-d only partially project into the guide paths 28a-b,29a-b with each of the load-bearing shoulder surfaces 24a-d slidably engaging its respective major track surface 17,18. As a result of this arrangement, the guide pins 22a-d do not bear the load of the sliding panel assembly 20 by bearing against the sides and/or bottoms of the guide paths 28b,29b, as in known horizontal sliders. In such known horizontal sliders, for example, debris and various forms of moisture can more easily collect and further interfere with the travel of conventional pins through conventional guide paths, and where wear and tear of the conventional pins/paths can cause reliability problems.

It has been found that by causing the left edge 20c of the sliding panel assembly 20 to seat before the seating of the right edge 20a, the window opening 13 becomes completely sealed off from, for example, debris and moisture. As mentioned above, the structure of the trailing guide paths 29a,b at the ends 31,32 minimizes any gap between the fixed panel 11 and the sliding panel assembly 20 when the sliding panel assembly 20 is in the closed position over the window opening 13.

As also mentioned above, it has been found that better sealing engagement (i.e., as it applies to seals 38a,c) results from the substantially perpendicular orientation of the trailing path ends 31,32 and the leading "S" ends 41,42, which in turn causes the remaining seals 38d,b to also be seated in an improved manner. This compares to conventional sliders that seal a backlite opening in a "glancing" manner, which tends to allow those sliders to leak, especially as time goes on and the seals associated with those sliders become more worn.

Figure 4:
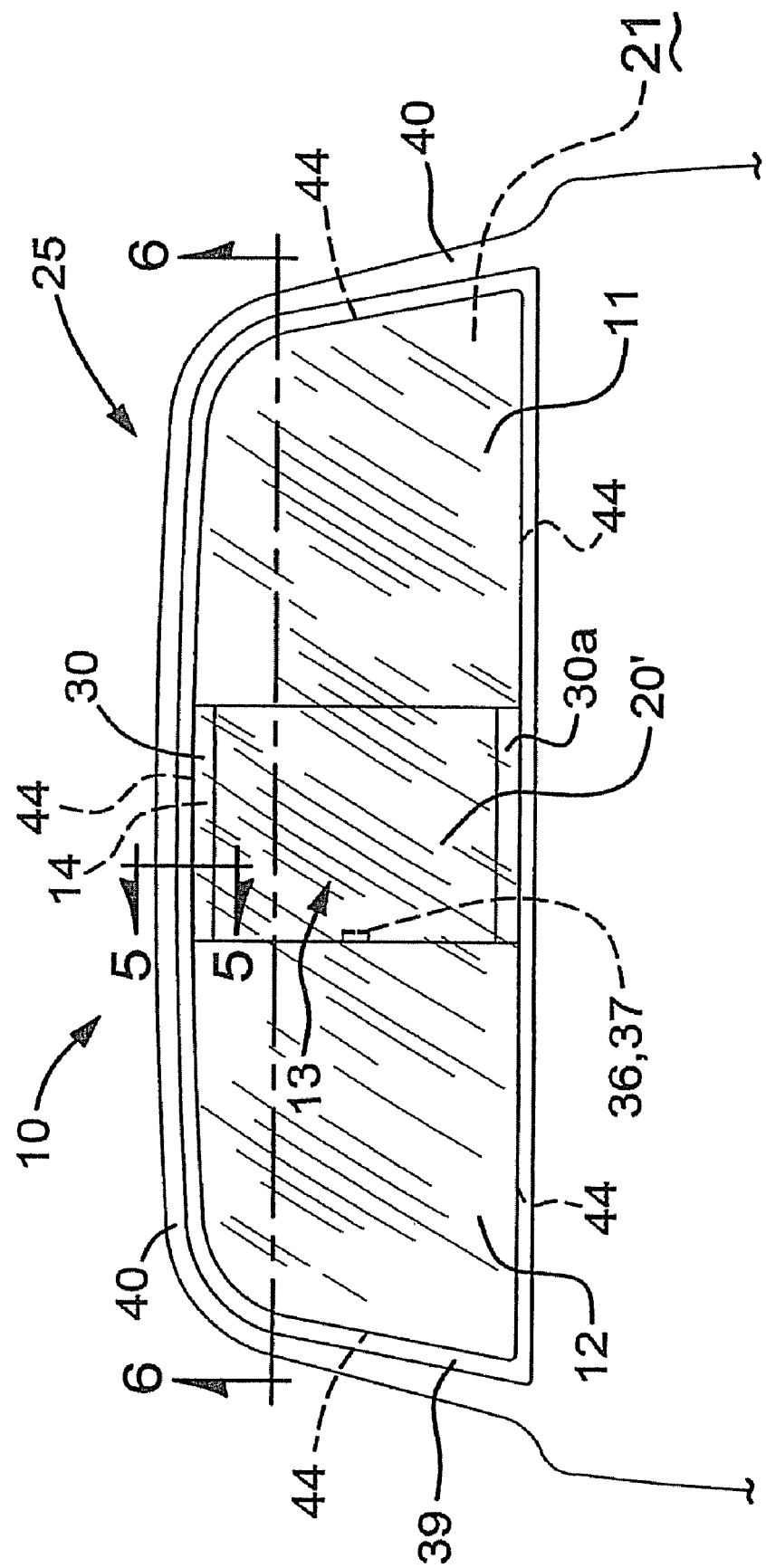
FIG. 4 illustrates a rear elevation view of the partial horizontal slider of FIG. 1.
Figure 7:
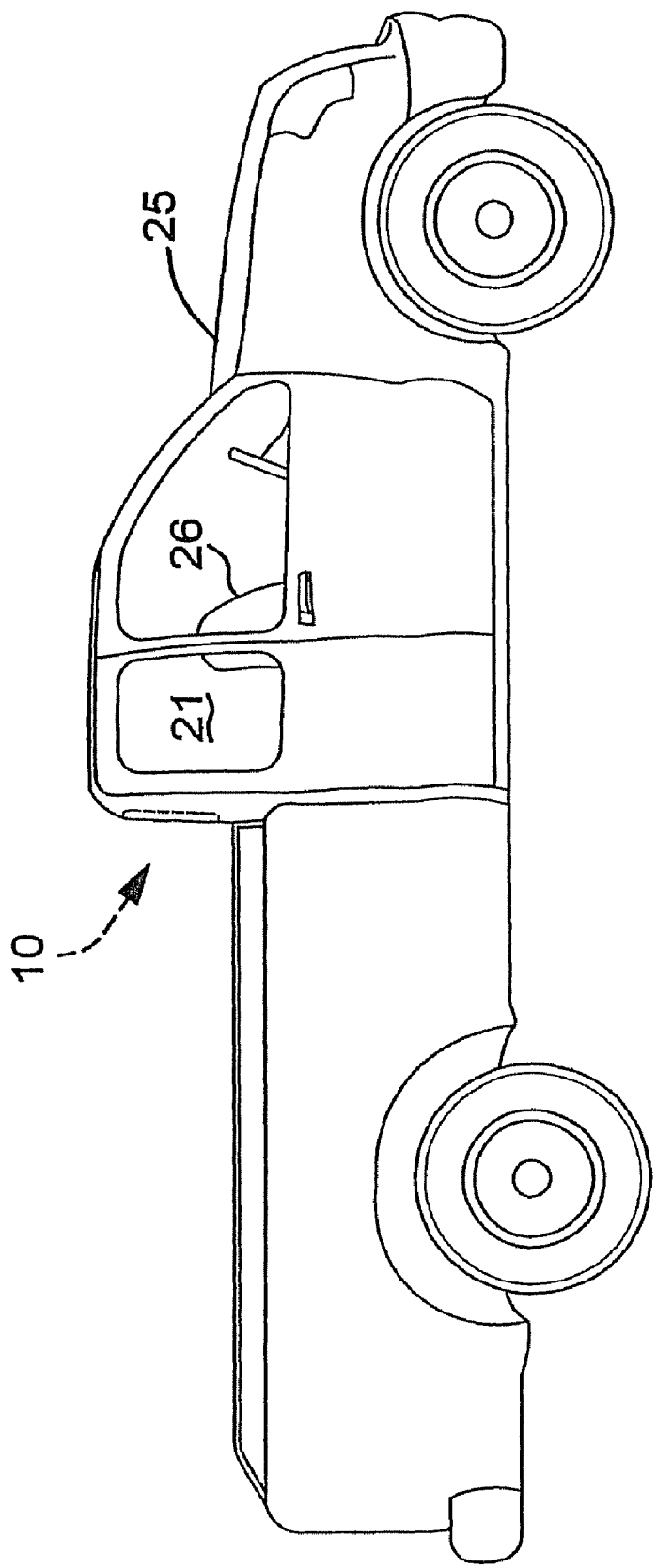
FIG. 7 is a side elevation view of a pick up truck in accordance with the present invention.

FIG. 4 illustrates the horizontal vehicle window assembly 10 from the back of the pickup truck 25 (also see FIG. 7), which is exterior to the passenger compartment 21. Although not shown in FIG. 1, the flush horizontal vehicle window assembly 10 is shown in FIG. 4 comprising a peripheral seal 39, for example, an encapsulating seal. The peripheral seal 39 is disposed around at least a portion of the periphery of the vehicle window slider assembly 10.

Also shown in FIG. 4 are the two fixed panels 11,12, an upper appliqué 30 and a lower appliqué 30a that are comprised of, for example, a polycarbonate (PC) compound, which are disposed in the plane of the fixed panels 11,12 and exteriorly over the frame 14 and respectively above (appliqué 30) and below (appliqué 30a) the window opening 13. Further shown is the sliding window panel 20', with the handle/latch 36 and receiver 37 hidden behind the sliding window panel 20'. Thus, as seen from the rear of a pick up truck 25, the aesthetically pleasing flush-flush slider 10 gives the impression that the backlite is one piece of glass, ceramic, glass-ceramic, or plastic that has no sliding assembly at all.

Hence, the present invention provides an aesthetically pleasing flush-flush horizontal vehicle window slider assembly 10 that is reliable, that has unencumbered sliding motion between the slider panel assembly 20 and the mating tracks 15,17 and guide paths 28,29, where the guide pins 22a-d do not wear and stick within the guide paths 28a,b and 29a,b. Thus, the flush-flush horizontal vehicle window assembly 10 reliably controls moisture and dirt at the backlite opening.

In combination, FIGS. 4-7 illustrate the flush relationship between the sliding panel 20' and the fixed panels 11,12, where the panels 20',11,12 are in the same plane, when the sliding panel 20' covers the backlite window opening 13. In addition, FIGS. 5 and 6 illustrate a flush-flush relationship between the slider panel 20', the appliqué 30 (which also applies to appliqué 30a), the fixed panels 11,12, and the vehicle body panel(s) 40, where at least all six items 11,12, 20',30,30a,40 are in the same plane.

The adhesion of the peripheral seal 39 to the vehicle body is attained by way of an adhesive 44, for example, a polyurethane bead that is disposed around the periphery of the fixed glass panels 11,12, the appliqués 30,30a, and possibly the frame 14 and the tracks 15,16.

Typically, it is difficult to adequately drain moisture away from a flush slider assembly, because, for example, drainage pathways are often blocked by the polyurethane bead 44 that attaches the flush slider assembly to the vehicle body panels 40. In the present invention, a drainage pathway 45 is disposed on the lower track 16 and drainage holes 46a,b (see, for example, FIG. 2) are disposed through the drainage pathway 45. Thus, moisture is directed through the lower track 16 where the moisture is not blocked by the polyurethane bead 44, since the drain-through holes 46a,b bypass the polyurethane bead 44.

In accordance with the provisions of the patent statutes, the principles and modes of operation of this invention have been described and illustrated in its preferred embodiments. However, it must be understood that the invention may be practiced otherwise than as specifically explained and illustrated without departing from its spirit or scope.

What is claimed is:

1. A vehicle window assembly adapted to be secured within a vehicle body opening, comprising:

a fixed panel defining a window opening;

an upper track disposed above the window opening and having an upper leading guide path and an upper trailing guide path formed therein;

a lower track disposed below the window opening parallel to the upper track, the lower track having a lower leading guide path and a lower trailing guide path formed therein; and a sliding panel having opposed upper and lower sliding panel edges with an upper leading guide pin secured at the upper sliding panel edge and received within the upper leading guide path, with an upper trailing guide pin secured at the upper sliding panel edge and received within the upper trailing guide path, with a lower leading guide pin secured at the lower sliding panel edge and received within the lower trailing guide path, and with a lower trailing guide pin secured at the lower sliding panel edge and received within the lower trailing guide path;

wherein each of the trailing guide paths is substantially perpendicular to the window opening at the end of each trailing guide path that is nearest to the window opening and each of the leading guide paths is formed in an "S" shape at the end of each leading guide path end where the leading sliding panel edge enters the window opening.

2. The vehicle window assembly of claim 1, whereby the leading sliding panel edge enters the window opening before the trailing sliding panel edge, and the trailing sliding panel edge leaves the window opening before the leading sliding panel edge leaves the plane of the fixed panels in a non-simultaneous manner.

3. The vehicle window assembly of claim 1, wherein the lower track has an upper surface where the lower guide path is formed therethrough and the lower guide pins are formed with a shoulder having a surface slidably engaging the upper surface of the lower track.

4. The vehicle window assembly of claim 1, further comprising a frame further defining the window opening.

5. The vehicle window assembly of claim 4, further comprising an upper appliqué and a lower appliqué that are disposed respectively above and below the window opening and over the frame, the appliqués being on a surface of the frame that is exterior to a vehicle compartment.

6. The vehicle window assembly of claim 5, wherein the appliqués comprise a polycarbonate compound, an acrylic material, or a painted surface.

7. The vehicle window assembly of claim 4, wherein the sliding panel is in the plane of the fixed panel when the sliding panel completely covers the window opening, thus forming a flush vehicle window assembly.

8. The flush vehicle window assembly of claim 7, wherein the sliding panel and the fixed panel are also in the plane of a vehicle body panel, thus forming a flush-flush horizontal vehicle window assembly.

9. The vehicle window assembly of claim 8, thereby closing the window opening in a non-simultaneous manner.

10. The vehicle window assembly of claim 9, wherein the frame, the upper track, and the lower track are integrally formed.

11. The vehicle window assembly of claim 1, wherein the farthest extent of each guide pin is separated from the farthest extent of its respective guide path, throughout the travel of each upper guide pin within the upper guide path, or the upper guide path may be open.

12. The vehicle window assembly of claim 1 mounted within a vehicle body opening.

* * * * *